United States Patent [19]
Flinth et al.

[11] 3,924,729
[45] Dec. 9, 1975

[54] BELT CONVEYOR WEIGHING SYSTEM
[75] Inventors: Rune Flinth; Kjell Nordström, both of Vasteras, Sweden
[73] Assignee: Conscale AB, Vasteras, Sweden
[22] Filed: Oct. 8, 1974
[21] Appl. No.: 513,101

[52] U.S. Cl.............................. 198/39; 177/DIG. 9
[51] Int. Cl.[2] ........................................ G01G 11/04
[58] Field of Search ............ 198/39; 177/DIG. 9, 16

[56] References Cited
UNITED STATES PATENTS
| | | | |
|---|---|---|---|
| 2,793,851 | 5/1957 | Ruge | 177/DIG. 9 |
| 3,339,650 | 9/1967 | Carr | 198/39 X |

*Primary Examiner*—Evon C. Blunk
*Assistant Examiner*—Bruce H. Stoner, Jr.

[57] ABSTRACT

Material carried by a conveyor belt is weighed through the use of a single load cell. The conveyor belt is associated with the load cell so that relative movement can occur therebetween, and side forces or twisting moments applied to the load cell are minimized. Specifically, a roller assembly, over which the belt is trained, is associated with the load cell in a manner to permit shifting of the roller assembly in directions transverse to the path of movement of the belt and also to permit oscillatory movement of the roller assembly about an axis parallel to the path of movement of the belt.

12 Claims, 8 Drawing Figures

BELT CONVEYOR WEIGHING SYSTEM

BACKGROUND OF THE INVENTION

The subject invention is directed toward the art of measuring and testing and, more particularly, to an improved apparatus for weighing material carried on a moving conveyor.

Many different devices and systems have been disclosed in the prior art for weighing material carried past a particular point on a moving conveyor belt. A typical prior system includes a plurality of sensors or load cells positioned at spaced locations under a predetermined area of the upper run of the belt. The load cells are mounted so as to be subjected to the weight of the material being carried by the belt. Through suitable electronics, the outputs from the several load cells are summed, averaged, or otherwise combined and related to the speed of the belt to give a relatively accurate indication of the weight of the material being carried therepast by the belt.

Prior art systems have been generally complex and expensive and have been particularly troublesome to install. A major problem in installation is the fact that the tension of the conveyor belt varies during service and accordingly belt tension must be adjusted and the height of the load cells must be adjusted during installation so that belt tension has a minimal effect on load measurement during service. This installation problem is particularly difficult when a plurality of load cells are utilized where adjustment of the height of one load cell relative to the belt could affect the other load cells. In known systems, such adjustments are made and remade in order to properly position the load cells and belt.

In addition, the load cells in prior art systems are commonly mounted in such a manner that they encounter side loads and twisting moments. Such may be encountered for a variety of reasons including environmental temperature changes which can cause the frame members, etc., associated with the load cell to expand or contract which in turn applies undesired forces on the load cells. In addition, the conveyor belt may tend to shift laterally due to load distribution thereon which also causes side forces and twisting moments to be applied to the load cells.

Moreover, it is important that the length of belt encountered by the load cell, namely, the measuring length, be maintained constant in order to provide for accurate measuring. This is important due to the fact that normally the load cell measurement is associated with a signal indicating belt speed so that the total weight over a time span is measured by the system, and, of course, if the measuring length on the belt varies, there is an inaccurate weight indication by the system. The maintaining of the measuring length of the belt constant is a problem due to the fact that the belt can shift, wear, and tension on the belt may change.

BRIEF DESCRIPTION OF THE INVENTION

The subject invention overcomes the above-discussed problems and provides a system in which accurate weighing can be accomplished due primarily to the fact that a single sensor or load cell is utilized in the system. This, of course, greatly simplifies the installation problems plaguing the prior art.

Further, in accordance with the present invention the belt conveyor and load cell are associated in such a manner that relative movement can occur therebetween and with a minimum of side forces or twisting moments being applied to the load cell.

The invention contemplates that a belt conveyor having a portion of its upper run supported by guide rollers will have at least one roller supported from a load sensor by means which permits the roller to shift in directions transverse to the belt and oscillate about an axis parallel to the belt. With at least one roller supported from the load sensor in this manner, the afore-mentioned side loads or twisting moments applied to the single load sensor are minimized.

In addition, the present invention provides for maintaining of a constant belt length for encountering the load sensor. This enables extremely accurate measurements to be made, particularly in systems where the load sensor signal is associated with a belt speed sensing signal for measuring the total weight carried by the belt over a time span. As noted above, it is extremely important for purposes of accurate measurement to maintain the measuring length of the belt constant.

In accordance with a more limited aspect of the invention, a group or assembly of rollers which extend transversely under the upper run of the belt are mounted in a common frame which is, in turn, supported by a spherical surface of the load sensor. The frame is supported for lateral sliding movement relative to the load sensor. The vertical component of force is directly transmitted through the spherical surface to the load sensor, but yet side forces and twisting moments on the load cell are minimized.

BRIEF DESCRIPTION OF THE DRAWINGS

Further features and advantages and a more complete understanding of the invention will become apparent from the following detailed description of preferred embodiments made with reference to the accompanying drawings wherein.

DETAILED DESCRIPTION OF THE PREFERRED EMBODIMENTS

Figure 1:
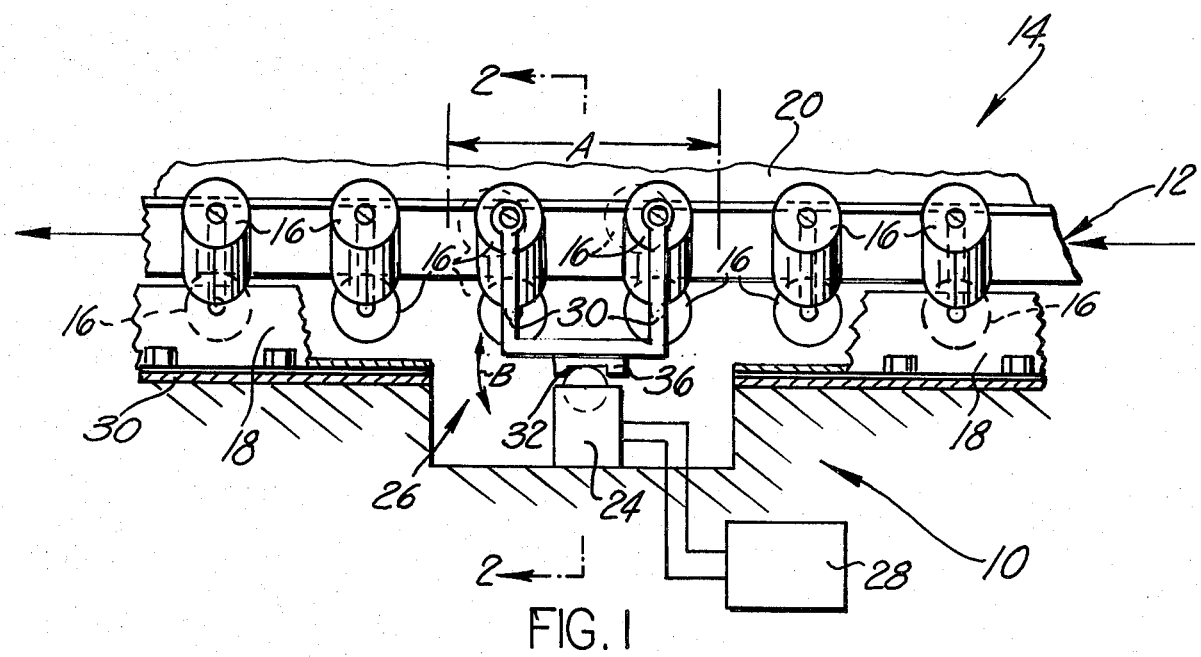
FIG. 1 is a side elevation of a preferred form of the invention (portions of the associated support structure have been broken away for the purpose of clarity)

Referring more particularly to the drawings wherein the showings are for the purpose of illustrating preferred embodiments of the invention only and not for the purpose of limiting same, FIG. 1 shows the overall arrangement of a single load cell conveyor weighing system 10 associated with a conveyor belt 12 of a conveyor apparatus 14. As is customary, the belt 12 is supported by suitable sets of rotatable guide rollers 16 which extend transversely of the direction of movement of the belt. In the subject embodiment, the rollers 16 are arranged in sets of three. Each set includes a middle roller which is mounted generally horizontally and associated with a pair of inclined side rollers, all of which are rotatably supported from a base frame 18. The arrangement of each set of rollers is such as to cause the belt 12 to have a concave configuration so as to efficiently carry a continuous load of loose bulk material 20.

As the material is conveyed past station A, it is weighed by the weighing system 10. In the subject embodiment, the weighing system 10 comprises a single load cell or sensor 24 which is positioned beneath and generally centrally of the conveyor belt 12. In the embodiment shown, the load cell 24 supports a roller assembly 26 which carries the conveyor belt 12 as it passes through station A. The particular type of load sensor used is not critical to the subject invention; however, it is shown as a conventional strain-gauge type of load sensor electrically connected to a control or read-out unit 28. This type of read-out unit is well known in the art and further description thereof appears unnecessary.

The single load cell or sensor 24 may be associated with a belt speed sensing unit so that the signals may be combined for indicating a total weight delivered by the belt over a time span. Of course, in such a system it is extremely important to maintain the measuring length of the belt constant, and it will be clear from the description herein that the length of the belt acting on the load cell is maintained substantially constant so that an accurate measurement is provided. In addition, however, the present system may be utilized as a gate control in a system for mixing materials by weight. In such a system, a signal is delivered to a gate for mixing one material with another material in response to the weight of the first material which is delivered into an area where the materials are mixed.

Of particular importance to the subject invention is the manner in which the load passing through station A is conducted to the load cell or sensor 24. As shown, assembly 26 comprises a generally U-shaped frame 30 which carries two adjacent sets of rollers 16. The two sets of rollers 16 carried by the frame 30 are laid out in the same pattern and aligned with the remaining roller sets. Note that they are positioned so as to maintain the concave belt configuration throughout the movement of the belt through station A.

Figure 2:
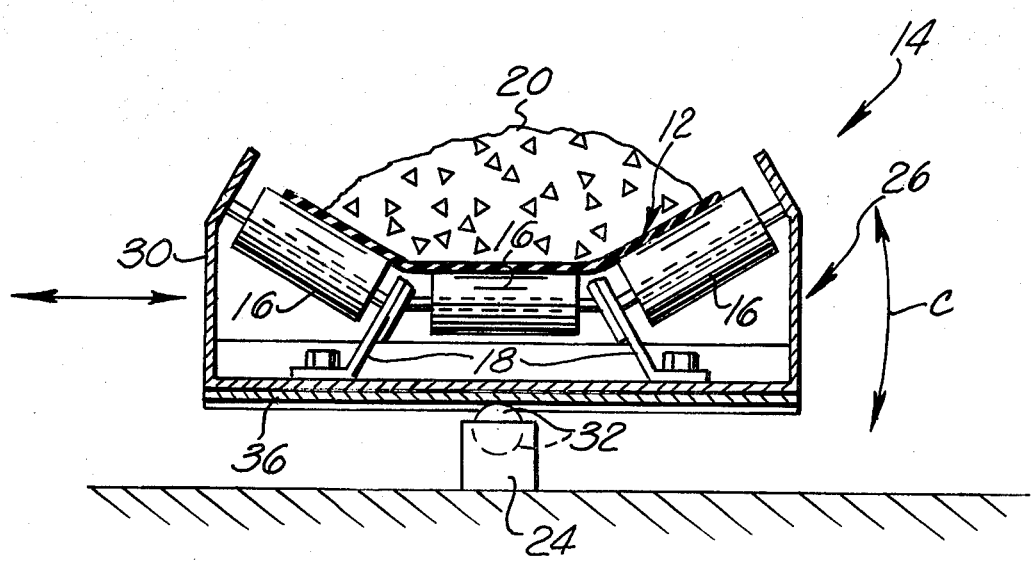
FIG. 2 is a cross-sectional view taken on line 2—2 of FIG. 1.

The assembly 26 is supported entirely from the single load cell or sensor 24. Consequently, all of the load applied to assembly 26 is conducted to the load cell 24. The assembly 26 is arranged so that it can shift horizontally as well as pivot about an axis parallel to the longitudinal axis of belt 12. For this reason, the upper end of the load cell 24 has a spherical surface 32 which supports the assembly 26. As best shown in FIG. 2, free movement of the assembly 26 in directions transverse to the longitudinal axis of the belt 12 is permitted as well as oscillatory or pivotal movement thereof. The pivotal movement can occur somewhat universally, and can occur about an axis transverse to the belt, as indicated by arrow B in FIG. 1, and about an axis parallel to the belt, as indicated by arrow C in FIG. 2. As a result of such construction, side forces and bending moments applied to the strain gauge 24 are substantially reduced as compared to a system where the strain gauge is rigidly attached to the belt frame.

In addition, it should be clear that the measuring length of belt acting on the rollers 16 carried by the frame 30 remains substantially constant, and as a result, the measuring length of belt to which the load sensor 24 is subjected remains substantially constant. This enables extremely accurate weighing to be effected, as noted hereinabove.

In order to prevent the assembly 26 from moving longitudinally of the belt while assuring that it has the above-noted movements, a suitable channel member 36 is secured to the lower portion of the frame 30. The channel member 36 rests on the surface 32 and defines a channel which extends transverse to the belt conveyor and which receives the spherical surface 32. It should be obvious that the member 36 guides transverse sliding of the frame 30, but does not interfere with pivoting thereof. It also should be clear that member 36 does prevent shifting of the frame 30 longitudinally of the belt.

Figure 3:
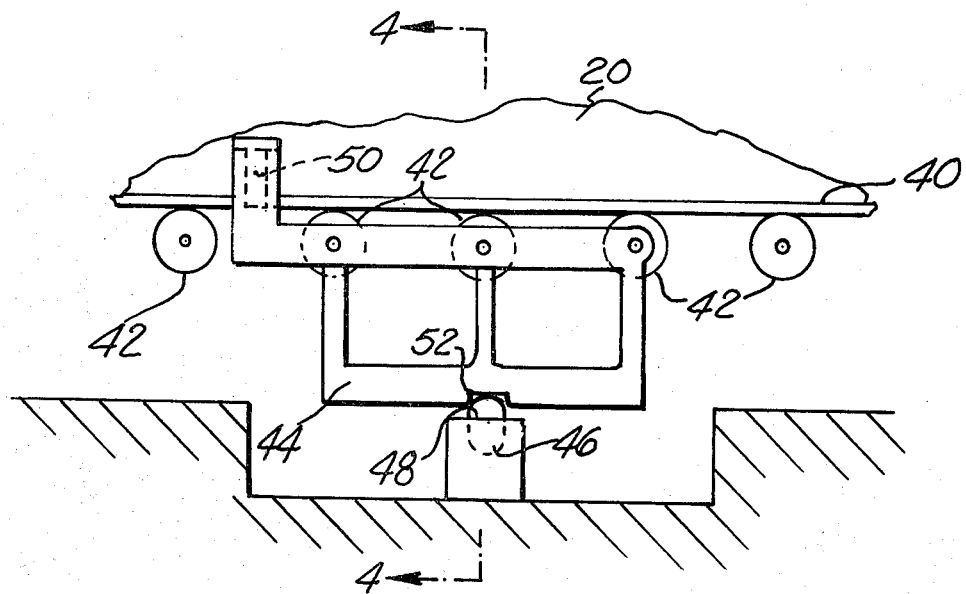
FIG. 3 is a side elevation of a second embodiment of the invention.
Figure 4:
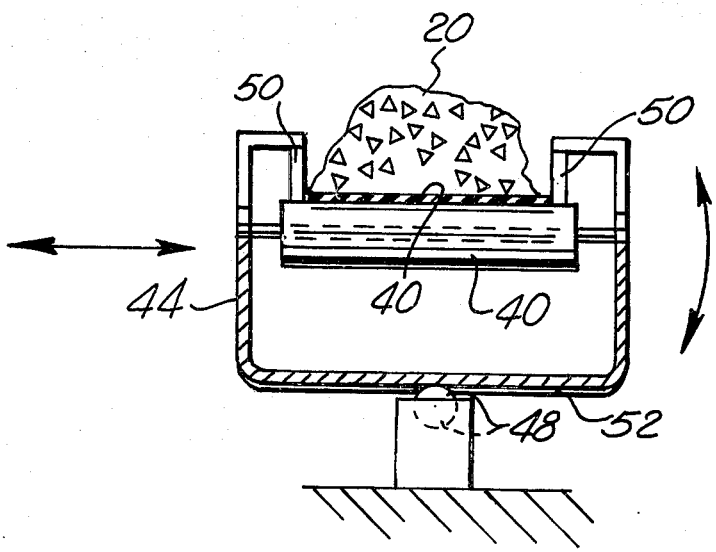
FIG. 4 is a cross-sectional view taken on line 4—4 of FIG. 3.

Many different arrangements could be provided to obtain the same results as the FIGS. 1 and 2 embodiment. For example, the embodiment shown in FIGS. 3 and 4 is arranged for use with a conventional flat belt conveyor assembly. As illustrated, a flat continuous conveyor belt 40 has its upper run supported from a plurality of horizontal, transversely extending roller members 42. The belt 40 can shift somewhat relative to the roller members 42. The three middle rollers 42 are carried from a support frame assembly 44 which, in turn, is entirely supported from a single load cell or sensor 46. Load cell or sensor 46, is of course, electrically connected to a control or read-out unit not shown. In the FIGS. 3 and 4 embodiment, as in the FIGS. 1 and 2 embodiment, the entire load of the support assembly 44 is transferred to the load cell 46 through a spherical surface 48 located in a channel on the frame 44. Like the FIGS. 1 and 2 embodiment, this permits the assembly 44 to shift in a direction transverse to the belt 40 as well as pivot about surface 48 in the manner described above with respect to FIG. 1.

Suitable guide or line-up rollers 50 are incorporated in the embodiment of FIGS. 3 and 4. These rollers 50 rotate about a vertical axis and tend to maintain the belt and material centered with regard to the strain gauge 46. However, in the event of some shifting of the assembly 44, the rollers are located so as not to detrimentally affect the strain gauge 46.

Figure 5:
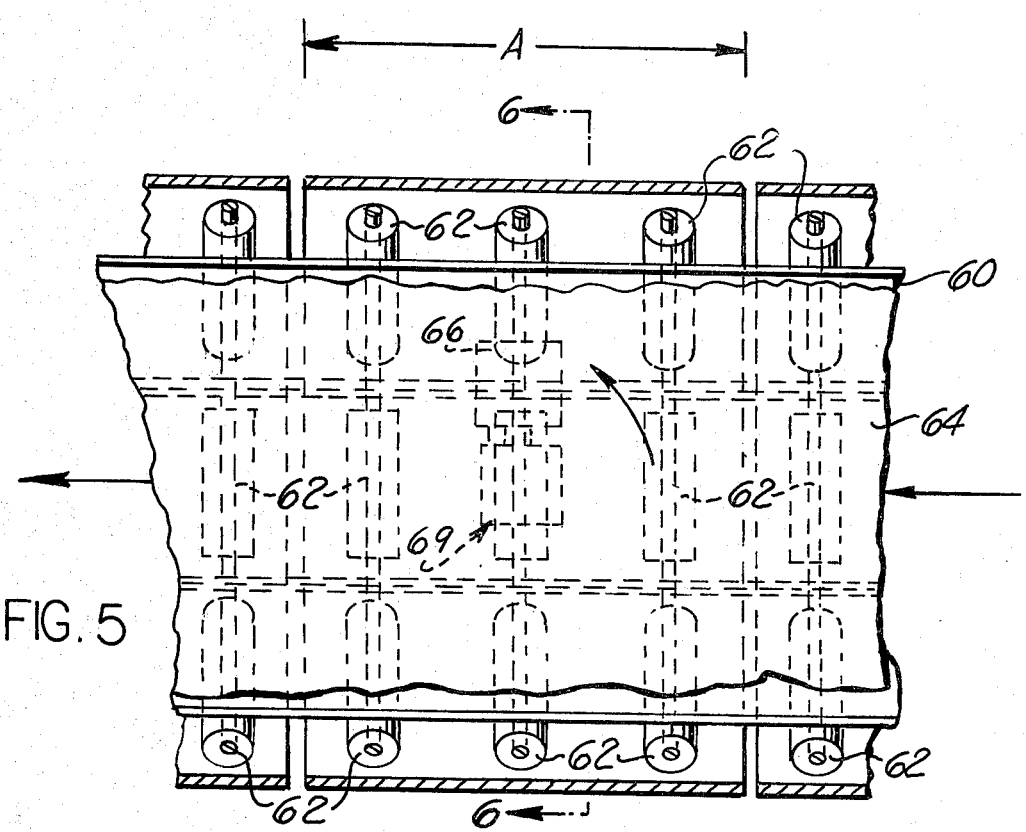
FIG. 5 is a plan view of a third embodiment of the invention.
Figure 6:
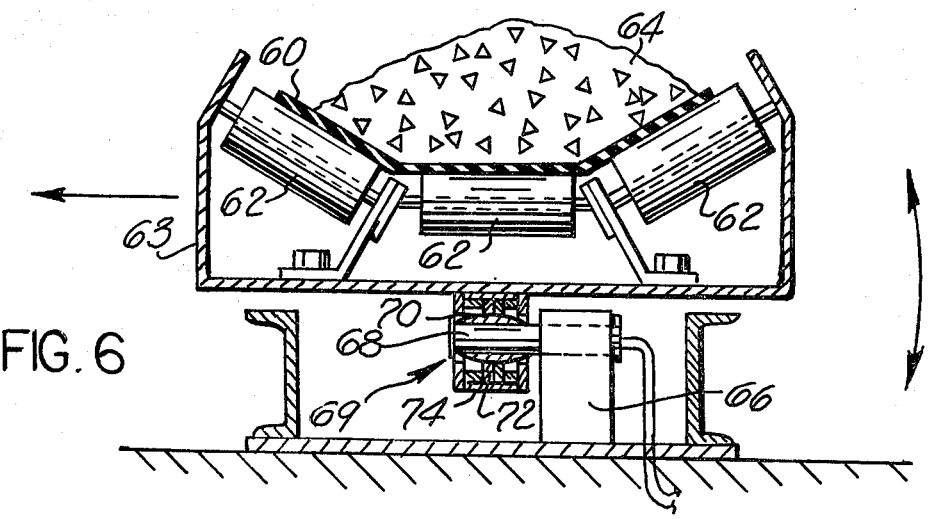
FIG. 6 is a cross-sectional view taken on line 6—6 of FIG. 1.

FIGS. 5 and 6 show a third embodiment of the subject invention. In this embodiment, the upper run of the conveyor belt 60 is supported by a plurality of rotatably mounted rollers 62 which are positioned in sets of three extending transversely of the belt. The arrangement of the rollers 62 is substantially identical to the arrangement described with respect to the FIGS. 1 and 2 embodiment. In particular, three sets of the rollers 62 are positioned generally in transverse alignment and mounted for free rotation. As shown, the rollers 62 are positioned so that the belt 60 has a generally concave configuration for carrying the bulk material 64. The three sets of rollers 62 which define the station A are carried by a generally U-shaped frame 63 which is independent of the frame which supports the rollers 62 adjacent the station A. Frame 63 is supported from a support 66 mounted subjacent the frame 53. A shear beam load cell 68 extends outwardly of the support 66 and transverse to the conveyor belt 60.

In order that the frame 63 can have the desired freedom of movement, a sliding ball connection 69 is provided between frame 63 and load cell 68. In particular, the connection 69 includes a ball-like member 70 which is axially slidable on the load cell 68. The ball-like member 70 receives a member 72 which can freely oscillate relative to the ball-like member 70. The member 72 is mounted within a sleeve or housing 74 which is directly connected to the underside of the U-shaped frame 63. As can be appreciated, the U-shaped frame 63 can oscillate about the center point of the ball-like member 70 and freely shift axially by movement of the ball-like member 70 on the load cell 68. In this manner, the frame 63 can move transversely. However, the frame 63 cannot bodily move longitudinally of the belt 60.

In addition, the ball-type connection between the load cell 68 and the frame 63 permits the frame 63 and the rollers carried thereby to have a degree of freedom for oscillatory movement about the outer surface of the ball 70. This is indicated by the arrows in FIGS. 5 and 6. Accordingly, the frame 63 can move as described in connection with FIG. 1.

Figure 7:
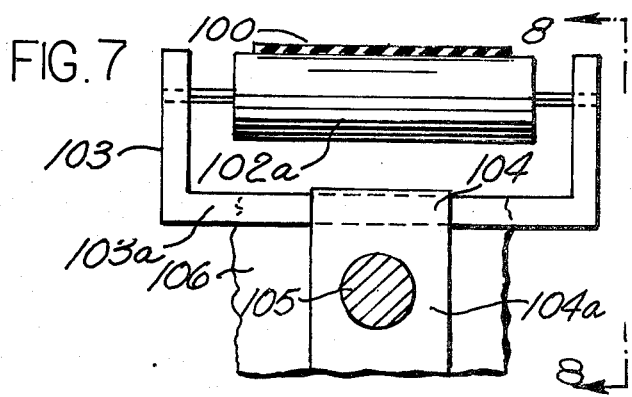
FIGS. 7 and 8 are views of still another further embodiment of the invention.
Figure 8:
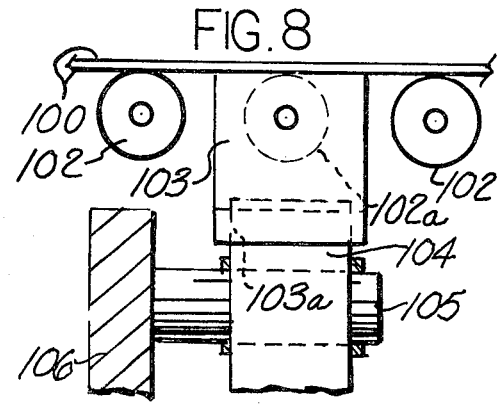

A still further embodiment of the present invention is illustrated in FIGS. 7 and 8. In this embodiment, a belt 100 is trained over a plurality of rollers 102. The belt is designed to carry material which is to be weighed. One of the rollers 102a, over which the belt is trained, is supported independently of the other rollers 102. The roller 102a is supported in a frame 103. The frame 103 has a horizontally extending portion 103a which extends transverse to the direction of movement of the belt. The portion 103a of the frame 103 is slidably received in a suitable support member 104 so that the frame 103 can slide laterally or transverse to the direction of movement of the belt 100. The support member 104 has a downwardly projecting portion 104a which, in turn, is supported on a shear-beam type load cell 105. The shear beam load cell 105 extends generally parallel to the direction of movement of the belt and has a generally circular periphery. The load cell 105 and support member 104 are associated so that the support member can pivot about the axis of the load cell 105, which axis, of course, extends parallel to the direction of movement of the conveyor. Further, it should be clear from the drawings that the load cell 105 is connected at one end to a suitable support frame member 106 in such a manner that the load cell 105 is fixed against movement longitudinally of the belt 100. In addition, the member 104 is secured on the load cell in such a manner that it also cannot move bodily in the direction of movement of the conveyor belt 100. This can be accomplished by any suitable means, such as snap rings.

In view of the foregoing, it can be seen that the embodiment illustrated in FIGS. 7 and 8, like the other embodiments, provides a weighing system which includes a single load cell and where the belt carrying the material being weighed can move laterally relative to the load cell without applying side loadings to the load cell. In addition, the frame which supports the conveyor belt on the load cell can pivot about an axis which extends in a direction parallel to the direction of movement of the belt; all of which minimizes the side forces applied to the load cell, as discussed above. In addition, it should also be clear that each of the embodiments described above utilizes a single load cell which greatly amplifies the problems, particularly of installation, to which known belt conveyor systems are subject.

The invention has been described in great detail sufficiently to enable one of ordinary skill in the art to make and use the same. Obviously, modifications and alterations of the preferred embodiment will occur to others upon a reading and an understanding of the specification and it is intended to include all such modifications and alterations as part of the invention, insofar as they come within the scope of the appended claims.

What is claimed is:

1. Weighing apparatus comprising a movable conveyor adapted to carry material through a weighing station to be weighed thereat, a single load cell at said weighing station for providing a signal indicative of the weight of the material as it is conveyed by said conveyor, means interposed between said conveyor and said single load cell to transmit a force indicative of the weight of the material to the single load cell, said means interposed between said conveyor and said single load cell including means for enabling relative movement to occur between said conveyor and said single load cell in directions transverse to the direction of movement of said conveyor.

2. Weighing apparatus as defined in claim 1 wherein said means interposed between said conveyor and said single load cell includes means for enabling said conveyor and said single load cell to relatively pivot about an axis parallel to the path of movement of said conveyor.

3. Weighing apparatus as defined in claim 2 further including roller members which extend generally transversely to the path of movement of the conveyor and support said conveyor during movement, at least one roller which supports said conveyor at said weighing station, a frame means supporting said at least one roller member, and said frame means being supported by said single load cell for movement in directions transverse to the path of movement of said conveyor and about an axis parallel to said conveyor.

4. Weighing apparatus as defined in claim 3 wherein said single load cell has a spherical surface engaging and supporting said frame means.

5. weighing apparatus as defined in claim 3 wherein said load cell comprises a shear-beam type load cell and a universal connection between said shear-beam type load cell and said frame means.

6. Weighing apparatus as defined in claim 1 further including means for preventing movement of said frame means in the direction of belt movement.

7. Weighing apparatus comprising a movable conveyor adapted to carry material through a weighing station to be weighed thereat, load cell means at said weighing station for providing a signal indicative of the weight of the material as it is conveyed by said conveyor, means interposed between said conveyor and said load cell means to transmit a force indicative of the weight of the material to the load cell, said means interposed between said conveyor and said load cell including at least one member for quiding said conveyor, a frame for said member and means for supporting said frame on said load cell to enable relative movement to occur therebetween in directions transverse to the direction of conveyor movement and for enabling relative pivotal movement to occur about an axis parallel to the path of movement of said conveyor.

8. Weighing apparatus as defined in claim 7 wherein said one member comprises at least one roller extending generally transversely to the path of movement of the conveyor, and said frame supports said roller.

9. Weighing apparatus as defined in claim 8 wherein means is provided for preventing movement of said frame in directions longitudinally of said conveyor.

10. Weighing apparatus as defined in claim 8 wherein said roller assembly comprises a plurality of rollers extending transverse of the direction of movement of said belt.

11. Weighing apparatus as defined in claim 7 wherein said load cell means comprises a single load cell.

12. Weighing apparatus as defined in claim 7 wherein said load cell means comprises a single load cell of the shear-beam type.

* * * * *